United States Patent
Harvey

(10) Patent No.: US 7,217,101 B2
(45) Date of Patent: May 15, 2007

(54) TURBINE ROTOR BLADE FOR GAS TURBINE ENGINE

(75) Inventor: Neil Wiliam Harvey, Derby (GB)

(73) Assignee: ALSTOM Technology Ltd., Baden (CH)

( * ) Notice: Subject to any disclaimer, the term of this patent is extended or adjusted under 35 U.S.C. 154(b) by 157 days.

(21) Appl. No.: 10/963,791

(22) Filed: Oct. 14, 2004

(65) Prior Publication Data

US 2005/0106027 A1 May 19, 2005

(30) Foreign Application Priority Data

Oct. 15, 2003 (GB) ................................ 0324203.9

(51) Int. Cl.
*F03B 3/12* (2006.01)
(52) U.S. Cl. .............. 416/223 A; 416/242; 416/DIG. 5
(58) Field of Classification Search ............ 416/223 A, 416/228, 235, 237, 238, 242, 97 R, 243, 416/DIG. 2, DIG. 5; 415/191–192, 208.1, 415/208.2
See application file for complete search history.

(56) References Cited

U.S. PATENT DOCUMENTS

| | | | |
|---|---|---|---|
| 4,682,935 A * | 7/1987 | Martin | 416/223 A |
| 5,525,038 A | 6/1996 | Sharma et al. | |
| 5,779,443 A * | 7/1998 | Haller et al. | 415/191 |
| 6,190,129 B1 * | 2/2001 | Mayer et al. | 461/97 R |
| 6,428,281 B1 | 8/2002 | Botrel et al. | |
| 6,554,572 B2 * | 4/2003 | Rinck et al. | 416/97 R |
| 2003/0086788 A1 | 5/2003 | Chandraker | |

FOREIGN PATENT DOCUMENTS

GB 2 359 341 A 8/2001
JP 58047102 A 3/1983

OTHER PUBLICATIONS

Search Report from GB 0324203.9 (Feb. 25, 2004).
Cohen, H., Rogers G.F.C., Saravanamuttoo H.I.H. "Gas Turbine Theory: $2^{nd}$ edition", pp. 232-235. (Longman Group Limited, 1972, Essex, U.K.).
"The jet engine." p. 86-88. (Rolls Royce plc, 1986, Derby, England).
Staubach, J.Brent et al. "Reduction of tip clearance losses through 3-D airfoil designs.", 12 pp, ASME 96-TA-13, Nov. 1998.

* cited by examiner

*Primary Examiner*—Edward K. Look
*Assistant Examiner*—Dwayne J White
(74) *Attorney, Agent, or Firm*—Cermak & Kenealy, LLP; Adam J. Cermak

(57) ABSTRACT

A rotor blade for a gas turbine engine includes a blade root (3) and an aerofoil projecting therefrom, the aerofoil having a leading edge and a trailing edge (5), a generally concave pressure surface (2) and a generally convex suction surface (1). The aerofoil shape of the blade varies in section along the length thereof such that:
the chord-wise convex curvature of the rear suction surface decreases towards the tip (4) of the blade;
the convex curvature of the early to mid suction surface increases towards the tip;
the stagger of the aerofoil section increases towards the tip; and
the trailing edge (5) is a straight line.

13 Claims, 8 Drawing Sheets

TURBINE ROTOR BLADE FOR GAS TURBINE ENGINE

This application claims priority under 35 U.S.C. § 119 to British application number 0324203.9, filed 15 Oct. 2003, the entirety of which is incorporated by reference herein.

BACKGROUND OF THE INVENTION

1. Field of the Invention

This invention relates to a turbine rotor blade for a gas turbine engine, to a turbine rotor incorporating such blades, and to a gas turbine engine comprising such a rotor.

2. Brief Description of the Related Art

The turbine of a gas turbine engine depends for its operation on the transfer of energy between the combustion gases and turbine. The losses which prevent the turbine being totally efficient are due in part to leakage flow of working fluid over the turbine blade rotor tips.

In turbines with unshrouded rotor blades, a portion of the working fluid flowing through the turbine tends to migrate from the pressure surface to the suction surface of the blade aerofoil through the gap between its tip and the stationary shroud or casing. This leakage occurs because of a pressure difference that exists between the pressure and suction sides of the aerofoil. The leakage flow also causes flow disturbances to be set up over a large portion of the span of the aerofoil, which also leads to losses in the efficiency of the turbine.

By controlling the leakage flow of air or gas across the tips of the blades it is possible to increase the efficiency of each rotor stage. One solution is to apply a shroud to the rotor tip. When the rotor blades are assembled together in the disc that carries them, these shrouds form a continuous ring that prevents the leakage flow from the aerofoil pressure to suction side at the tip. There is still an axial leakage through the gap between the casing and the rotating shroud, but the penalties in terms of aerodynamic losses are much reduced—often helped by the inclusion of a form of labyrinth seal on the shroud top.

However, the rotating shroud has a large weight penalty. As a result, the aerofoil blade speed may be constrained, to achieve acceptable blade stresses. This, though, will have the effect of increasing the aerodynamic loading that also results in reduced efficiency, negating some of the benefit of the shroud.

The use of a shroud ring is made more difficult if the turbine blades also operate at very high temperatures, desirable in helping to achieve high thermal efficiencies. These temperatures are limited by the turbine vane and blade materials. Cooling of these components is necessary to achieve acceptable component life, which is a function of the material temperature, stresses and material properties.

A large number of cooling systems are now applied to modern gas turbine blades. Such cooling systems are described for instance in Cohen H, Rogers G F C, Saravanamuttoo H I H, 1981, "Gas Turbine Theory", p. 232–235, Longman, and Rolls-Royce plc, 1986, "The Jet Engine", p. 86–88, Renault Printing Co Ltd. The more cooling that is provided, the lower the resulting material temperatures, and thus the higher the blade stresses allowable for a given component life. Cooling is achieved using relatively cool fluid bled from the upstream compressor system, bypassing the combustion chamber between the last compressor and first turbine. This air is introduced into the turbine blades where cooling is effected by a combination of internal convective cooling and external cooling. However, this cooling comes at a penalty. Its use penalises the overall efficiency of the machine, and as a result the turbine designer tries to minimise the quantity of cooling air used. All of these design constraints often leads to rotor blades of first staged turbines being shroudless—the extra weight and thus higher stresses caused by a shroud ring simply cannot be accommodated. However, ways of reducing the high aerodynamic penalty of the resulting tip leakage flow continue to be sought.

U.S. Pat. No. 5,525,038 discloses a blade aerofoil design intended to reduce tip leakage losses. In that document, the tip region of the suction side of the aerofoil has a bowed surface with an arcuate shape. The arcuate shape of the bowed surface has progressively increasing curvature toward the tip of the rotor blade, so that a radial component of a normal to the suction side bowed surface becomes progressively larger toward the tip. It is to be noted that the aerofoil has a bowed surface in the tip region extending chordally all the way from the leading edge to the trailing edge. In addition, all the leans of the tip described, whether tangential and/or axial, are applied to the whole of the tip region.

A particular area of the blade that requires attention in its design is the trailing edge. Preferably, this is kept thin to minimise aerodynamic losses, but as a result it is difficult to cool, and tensile stresses have to be minimised. Cooling is achieved by films of air ejected upstream of the trailing edge on to the aerofoil surfaces, and by drilling cooling holes into the trailing edge fed from larger radial passages within the main body of the aerofoil. The aerofoil disclosed in U.S. Pat. No. 5,525,038 thus has some disadvantages: firstly, the curved trailing edge cannot easily have cooling holes machined into it. Ideally, this is done in one operation to minimise cost, but this requires all holes to lie in the same plane, i.e. the trailing edges of the aerofoil sections making up the blade have all to lie in one plane. A curved trailing edge (with a progressively increasing curvature) will require holes to be machined in multiple operations, incurring significant extra cost. Secondly, the leant tip will give rise to additional bending stresses in the blade. In the main body of the blades these can usually be accommodated by changes in the detailed design, such as increasing wall thickness locally. However, this cannot be done in the trailing edge region, there will simply be higher stresses in it. This will result either in a reduced life of the component, or require additional cooling, which will impair the performance of the engine.

SUMMARY OF THE INVENTION

Accordingly, the technical problem to be solved by the present invention is to provide a turbine rotor blade for a gas turbine engine which avoids the drawbacks of the cited prior art but still provides reduced tip leakage losses. Further, the manufacturing costs should be kept low and the reliability high.

An exemplary embodiment in accordance with principles of the present invention provides a rotor blade for a gas turbine engine, the blade comprising a blade root and an aerofoil projecting therefrom, the aerofoil having a leading edge and a trailing edge, a generally concave pressure surface and a generally convex suction surface, and is characterised in that the aerofoil shape varies in section along the length thereof such that:

the chord-wise convex curvature of the rear suction surface decreases towards the tip of the blade;

the convex curvature of the early to mid suction surface increases towards the tip;

the stagger of the aerofoil section increases towards the tip; and the trailing edge is a straight line.

The terms "concave" and "convex" refer in this context to the chordwise direction. Preferably, the increase in stagger is such as to give rise to chord-wise convex curvature on the pressure surface. This has the aerodynamic result that velocities on the pressure surface are increased, reducing the local static pressure which drives the over-tip leakage, thus reducing the leakage further.

The line of the trailing edge is advantageously radial, but it may be leant at some radial and/or tangential angle α (see FIG. 13), depending on the aerodynamic and mechanical details of the design.

The chord-wise convex curvature of the rear suction surface may be eliminated in the tip section to give a flat back surface, or it may even be reversed so as to be concave.

The lower part of the aerofoil will exemplarily have a minimum radial extent of 40% and a maximum radial extent of 80% of the span. The tip section is preferably geometrically and aerodynamically blended smoothly into the lower portion of the aerofoil. The blending of the aerofoil between the tip section and the lower portion will preferably be such as to evenly redistribute the aerodynamic loading radially away from the tip.

The trailing edge regions of the aerofoil sections are preferably shaped so as to be similar in 2-D plan view, such that a row of chord-wise running cooling holes 6 see FIG. 16 provided in the trailing edge will lie in a radial geometric plane, enabling them to be machined in a single operation.

The increased stagger of the aerofoil tip section, relative to the lower, datum portion, will cause the front/mid portion of the aerofoil tip region to be tangentially leant, in a direction towards the suction side. Unlike the arrangements disclosed in U.S. Pat. No. 5,525,038, the leaning is confined to a limited part of the tip, while the trailing edge is kept straight. Thus, in the tip region only the front/mid portion of the suction surface may be concave in the radial direction, and only the front portion of the pressure surface may be convex in the radial direction.

The invention also provides a turbine rotor for a gas turbine engine, comprising a plurality of turbine blades in accordance with the invention. The invention further provides a gas turbine engine including the turbine rotor of the invention.

BRIEF DESCRIPTION OF THE DRAWINGS

A more complete appreciation of the invention and of the attendant advantages thereof will be readily obtained as the same becomes better understood by reference to the following detailed description when considered in connection with the accompanying drawings. In the drawings.

DETAILED DESCRIPTION OF EXEMPLARY EMBODIMENTS

Before describing in detail the geometric configuration of a turbine rotor blade in accordance with the invention, it is useful to describe how the configuration operates, and in particular how it affects the turbine rotor aerodynamics. First the basic turbine aerodynamics will be considered, then the benefits of aerodynamically off-loading the tip, and finally the detail of the invention will be described.

Figure 1:
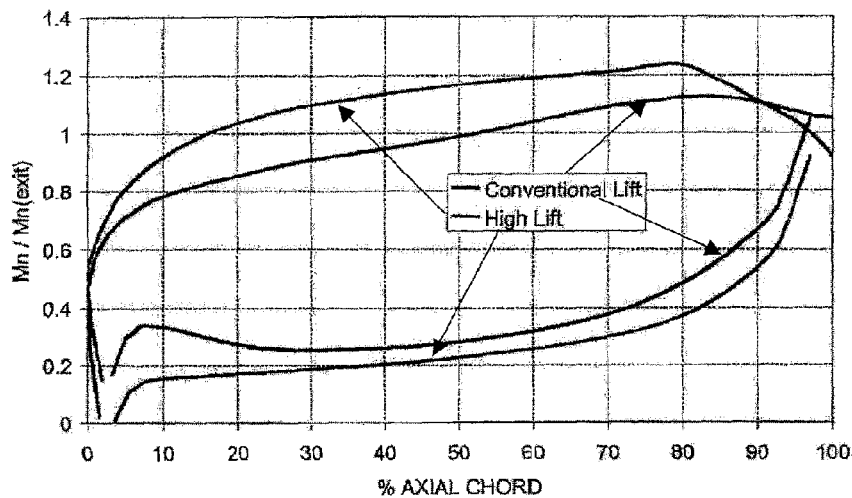
FIG. 1 is a plot of Mach number distributions (normalised to exit) for the mid-span aerofoil sections of two rotor blades according to the prior art.

The turbine blade of the invention is of a "high lift" aerodynamic design, and FIG. 1 is a graph comparing the Mach number distributions (normalized to exit) for the mid-span aerofoil sections of two rotor blades that have the same axial chord and the same inlet and exit flow conditions as each other. The two aerofoils are differentiated as follows:

A conventional (low) lift aerofoil characterized by only a small diffusion of the flow from the Mach number point on the late suction surface to the trailing edge (known as "back surface diffusion").

A high lift aerofoil, carrying approximately 36% more lift than a conventional profile, achieved by increasing the pitch of the profiles in the same proportion to give a reduction in aerofoil numbers of about 30%. The back surface diffusion is now much larger, and the peak Mach number has significantly increased.

Figure 2:
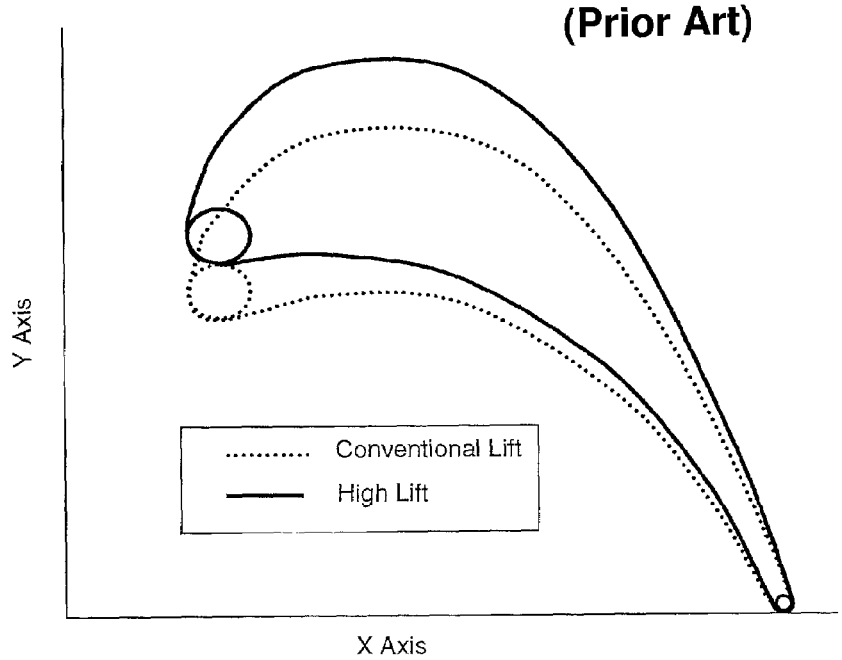
FIG. 2 is an illustration of the mid-span section profile shapes for the blades plotted in FIG. 1.
Figure 3:
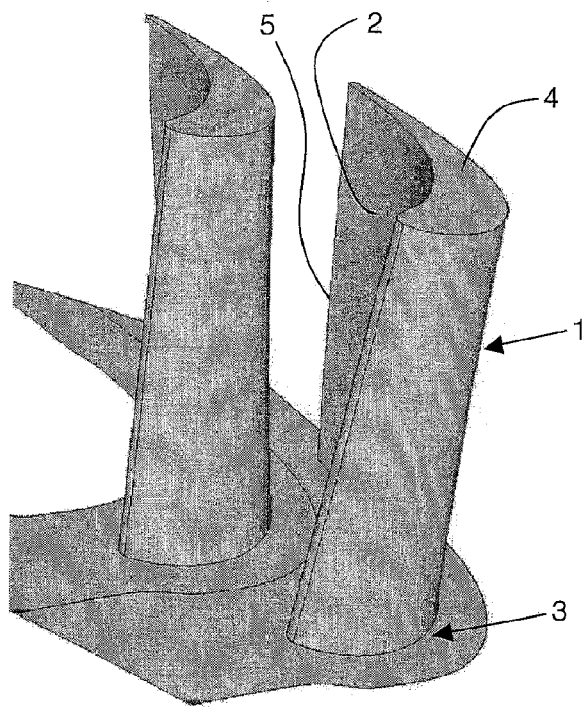
FIGS. 3 and 4 are isometric views of the full aerofoil shapes of the blades of FIGS. 1 and 2.
Figure 4:
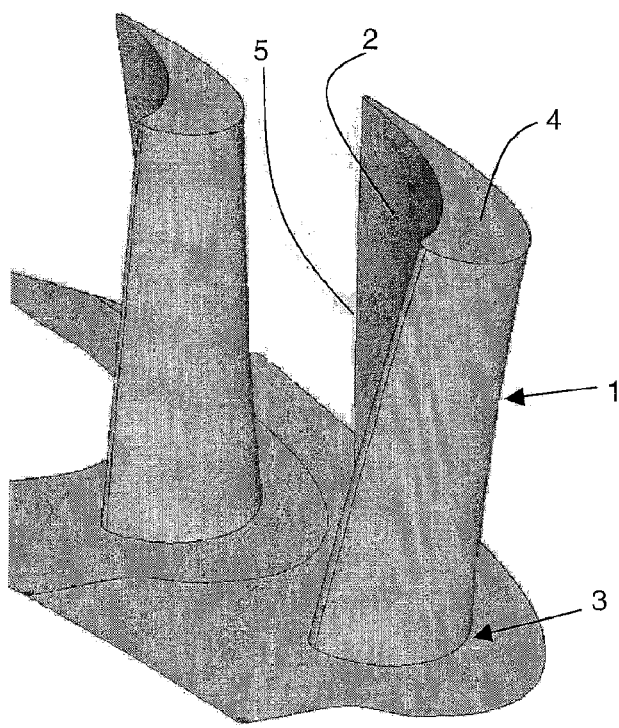

FIG. 2 compares the mid-span section profile shapes. The full aerofoil shapes of the two blades are shown in isometric view in FIG. 3 (conventional) and FIG. 4 (high lift). The increased pitch of the high lift blading is clear. Both aerofoils clearly have convex curved suction surfaces 1 (in the chord-wise direction), with the locations of the peak Mach number point coinciding with a local maximum in the surface curvature. Each blade has concave pressure surfaces 2, a root end 3 and a tip 4. Both aerofoils are radially stacked in the same way on a straight line 5 through the centres of the trailing edge circles.

Figure 5:
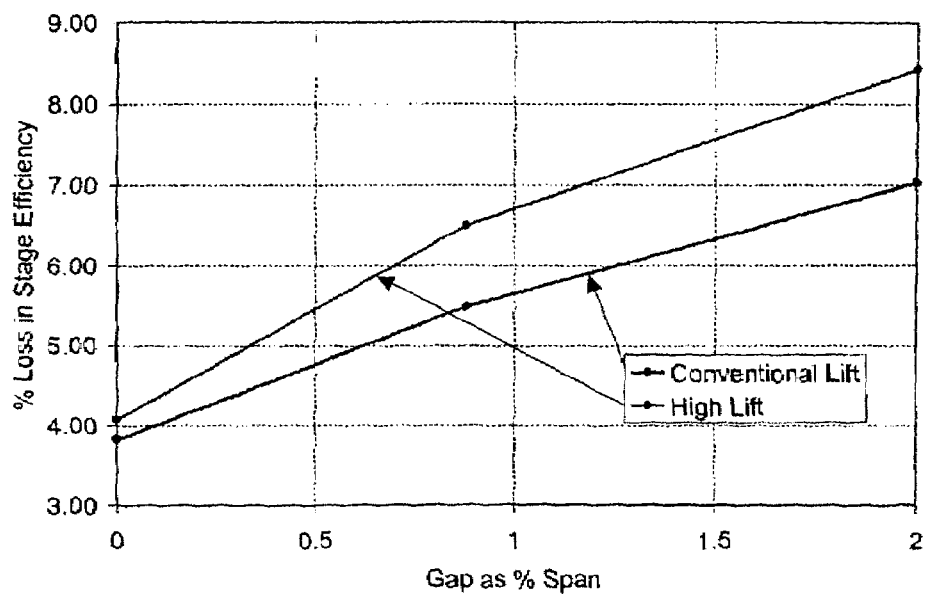
FIG. 5 is a plot of percentage loss of turbine stage efficiency against tip clearance or gap as a percentage of blade span, produced by Computational Fluid Dynamics (CFD)

Calculations of the flow around these two aerofoils have been performed using Computational Fluid Dynamics (CFD) over a range of tip clearances. The results, in the form of predicted rotor loss (expressed as a percentage of turbine stage efficiency) against tip gap (expressed as a percentage of rotor span) are shown in FIG. 5. It should be noted that these predictions would not normally be used to give absolute values of efficiency, but may still demonstrate qualitative differences between different geometries.

ASME 96-TA-13, November 1998, "Reduction of Tip Clearance Losses Through 3-D Airfoil Designs", Staubach J B, Sharma O P, Stetson G M (reference 3) gives a typical value for the over-tip leakage loss exchange rate of a turbine rotor blade of about numeral 2% of stage efficiency for 1% gap/span. The values shown in FIG. 5 for the conventional blade are slightly less than this, confirming that CFD is best used for qualitative predictions, rather than absolute accuracy.

Figure 6:
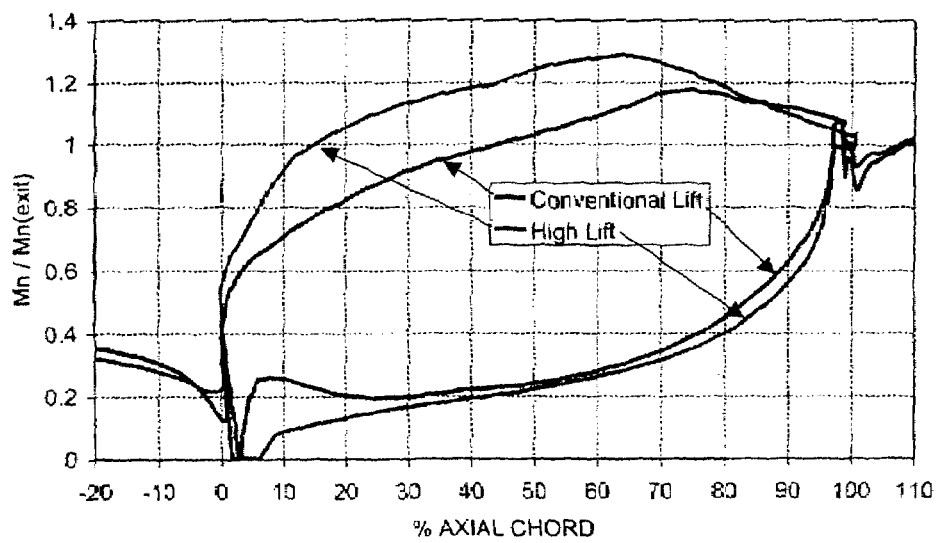
FIG. 6 is a plot of tip Mach number distribution, as calculated by CFD, for the aerofoils shown in FIGS. 3 and 4.

FIG. 5 also shows that at zero tip gap, the two aerofoils have almost the same loss (given the accuracy of the CFD code used). However, it is clear that the high lift aerofoil has significantly higher tip leakage losses than the conventional one, at any given tip gap. The reason for this can be seen in FIG. 6. This compares the calculated Mach number distributions at 90% span, near the tip, for the conventional and high lift aerofoils respectively. The much higher aerodynamic loading of the high lift aerofoil gives rise to higher tip leakage and higher mixing losses, due to the higher gas stream velocities on the suction side.

Figure 7:
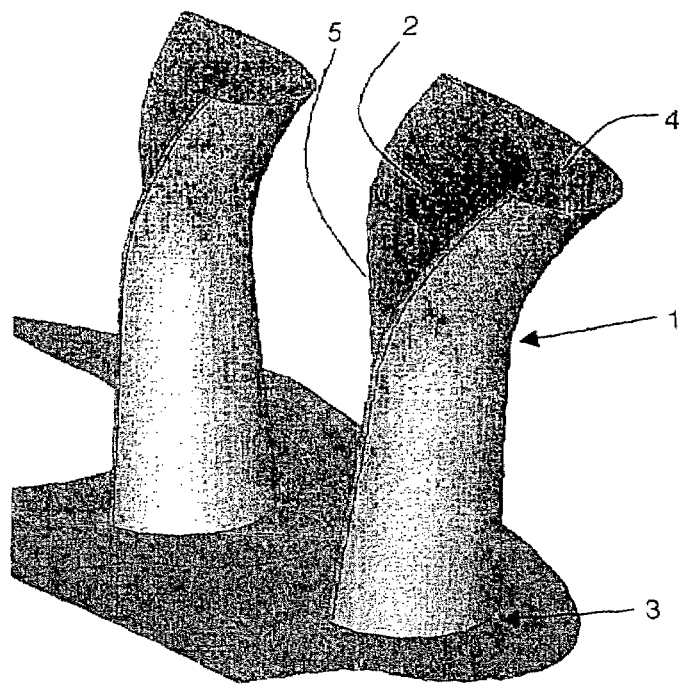
FIG. 7 is an isometric view of two high lift aerofoils which have been restacked to give a lean.

Reference 3 shows how leaning the blade tip, as illustrated in U.S. Pat. No. 5,525,038, reduces the tip leakage loss. To demonstrate this, the high lift aerofoil has been stacked as described in Reference 3, and the resulting flow field calculated again by CFD. FIG. 7 shows an isometric view of the restacked, high lift aerofoil. The lean is purely tangential, beginning at about 60% span, the curve of the stacking axis being parabolic in shape with the highest angle to the vertical (40°) being at the tip.

Figure 8:
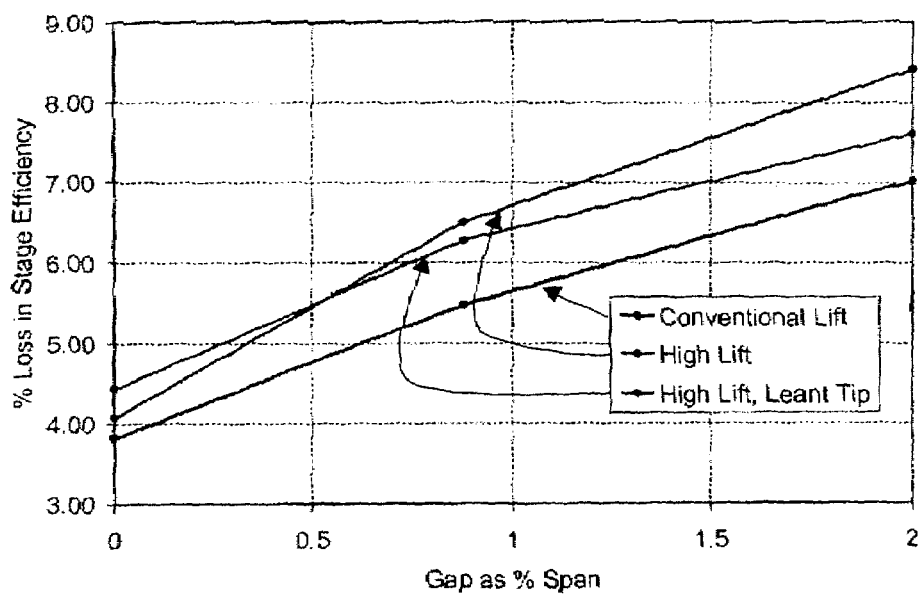
FIG. 8 repeats the plot of FIG. 5, but with comparative results for the aerofoil of FIG. 7 included.

FIG. 8 repeats the plot of FIG. 5 (rotor loss as a percentage of the stage efficiency versus percentage gap/span) but now with the leant rotor tip results added. The tip leakage loss is reduced, but the zero gap loss is higher, which means that it is only really beneficial at larger tip gaps.

Figure 9:
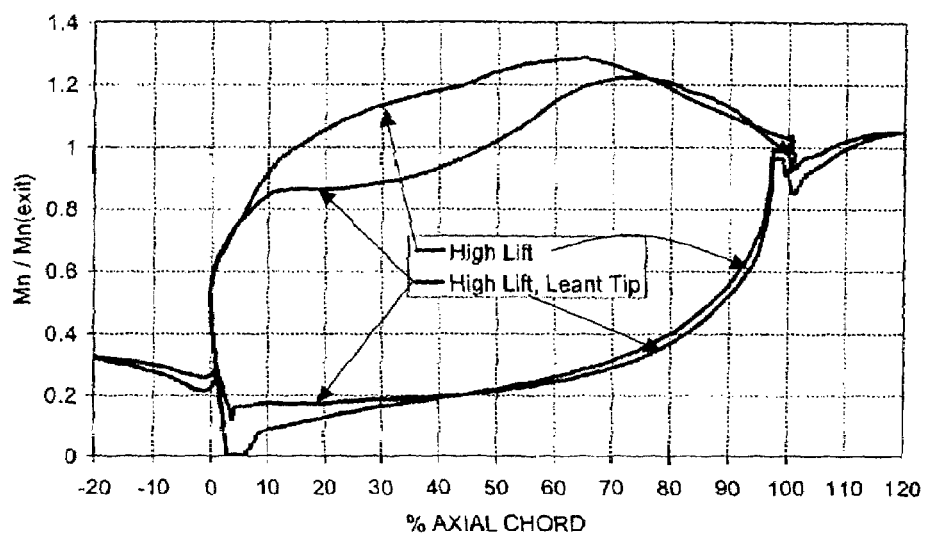
FIG. 9 is a plot of the calculated Mach number distribution for the aerofoils of FIGS. 3 and 7 at 90% of the span.
Figure 10:
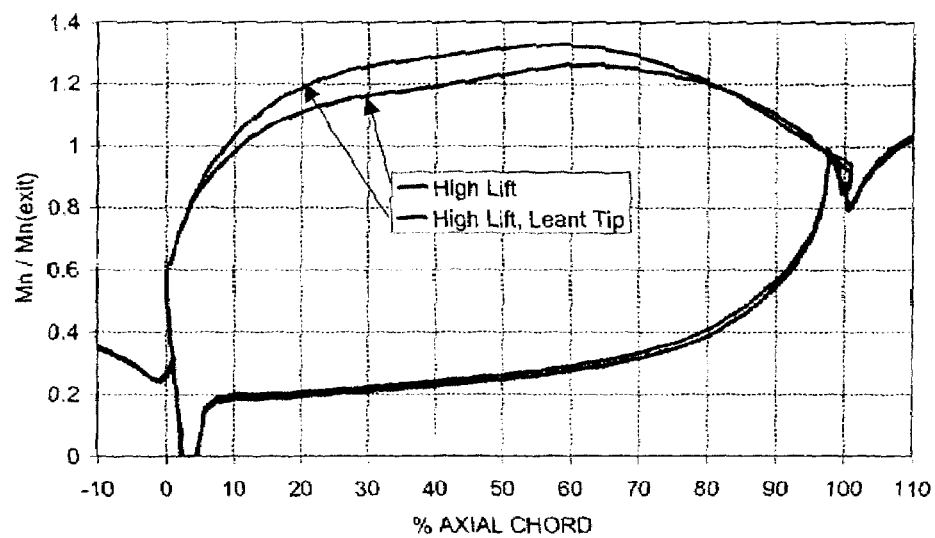
FIG. 10 is a corresponding plot at mid-span.

The reasons for this can be understood by comparing the calculated aerofoil Mach number distributions for the straight and leant tip aerofoils at 90% span (FIG. 9), and at mid-span (FIG. 10). FIG. 9 shows how the tip lean has off-loaded the need suction surface of the tip section; this results in reduced tip leakage loss. However, the loading has been redistributed down the span, as can be seen at mid-span in FIG. 10. The higher surface velocities here result in increased profile (wetted area) losses, and although these are somewhat reduced near the tip, the overall effect is an increase in loss at zero gap.

FIG. 9 is also noteworthy in that the tip lean is shown to only off-load the early/mid part of the aerofoil suction surface. This is one of the drawbacks of simply leaning the aerofoil tip whilst leaving the aerofoil shapes unchanged. The velocity distribution on the late suction surface is largely unaffected, which limits the reduction in the aerodynamic loading at the tip that can be achieved.

Figure 11:
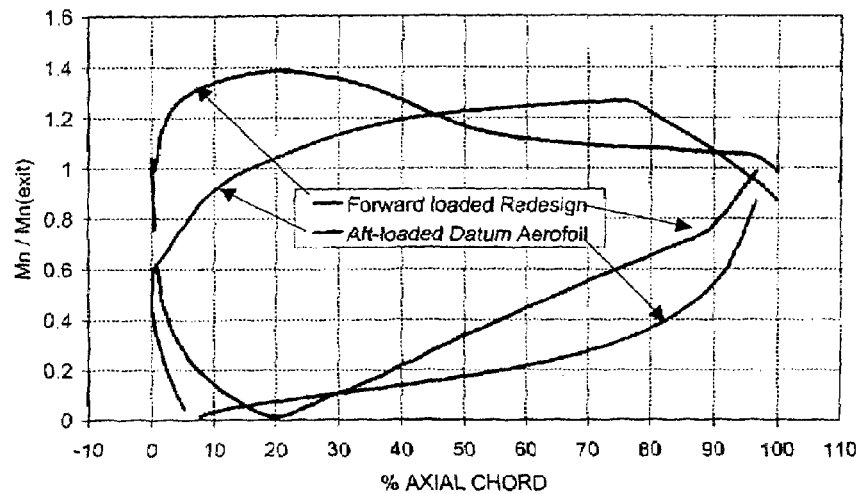
FIG. 11 is a plot of calculated 2-D Mach number distributions for the conventional and redesigned blade illustrated in FIG. 12.
Figure 12:
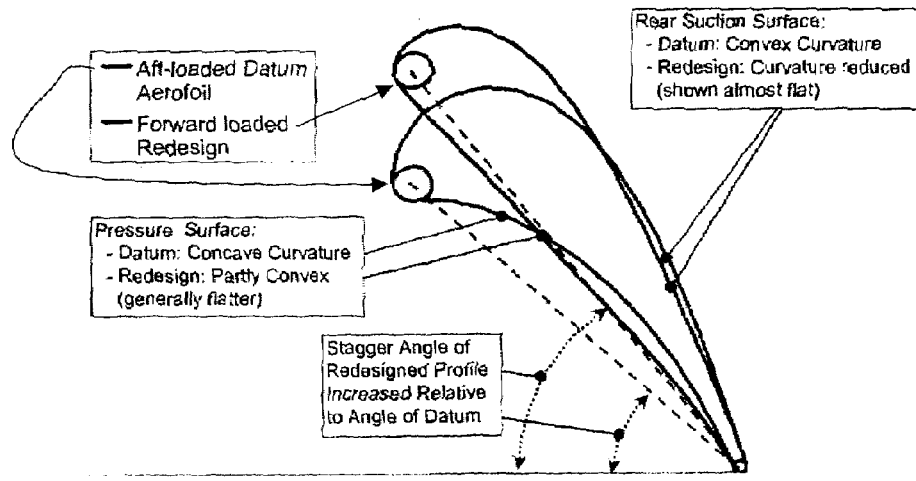
FIG. 12 is a sectional view comparing a conventional aft-loaded aerofoil tip section with a corresponding section of a blade in accordance with the invention.

Referring now to FIG. 12, in accordance with the invention, the 2-D aerofoil section at the tip is redesigned to significantly change the velocity distribution. Instead of being aft-loaded, the loading is moved forward, when analyzed as simply a 2-D aerodynamic section. This can be seen in FIG. 11, which compares the calculated 2-D Mach number distributions for the original and redesigned tip sections at 90 percent span. The redesigned profile shown is an extreme example, where the loading has been moved to the front of the aerofoil. More usually, the loading will be moved to the mid region. The design of the aerofoils in the lower portion of the blade, radially from the hub to, typically, around mid-span remains strongly aft-loaded. The change in the 2-D lift distribution of the tip section is effected by reducing the chord-wise convex curvature on the late suction surface and increasing this curvature in the front/mid region. It is possible that the late suction surface can become flat or even concave, to minimize the lift locally. As a result of the changes in the surface curvature of the tip section, the stagger of the section increases. Stagger is here defined as the angle between the turbine centre line and a line drawn through the centers of the leading and trailing edge circles of the aerofoil. Thus, the front part of the redesigned aerofoil is moved in the direction of the suction surface, relative to the original design, when viewed with the trailing edges coincident, as shown in FIG. 12.

Figure 13:
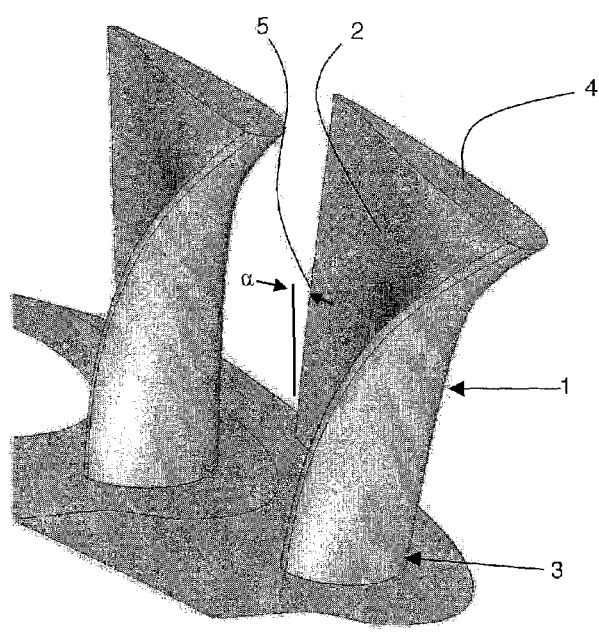
FIG. 13 is an isometric view from the front of rotor blades in accordance with an exemplary embodiment of the invention.

The redesigned tip section, with lift moved forward, is now stacked with the aft-loaded aerofoils in the lower portion to produce the aerofoil shown in isometric view in FIG. 13. The stack is on a radial line through the trailing edge, as with the original high lift aerofoil. It can be seen that with the radially straight trailing edge 5, the progressive increase in aerofoil stagger up the span results in local tip lean in the forward part of the aerofoil. This local tip lean has the effect of redistributing the aerodynamic loading in the front part of the aerofoil radially, from the tip downwards to the lower aerofoil sections. It should be remembered that the 2-D design of the tip section deliberately moved the lift forward to the mid/front regions of the aerofoil, where the local lean has the most effect. The redistribution of lift radially inwards from the tip region is similar to that caused by leaning the whole tip, and results in increased lift on the lower aerofoil sections. Since this extra lift is in the front/mid part of the suction surface, it can be seen that designing these lower sections to be strongly aft-loaded will in part compensate for this.

Figure 14:
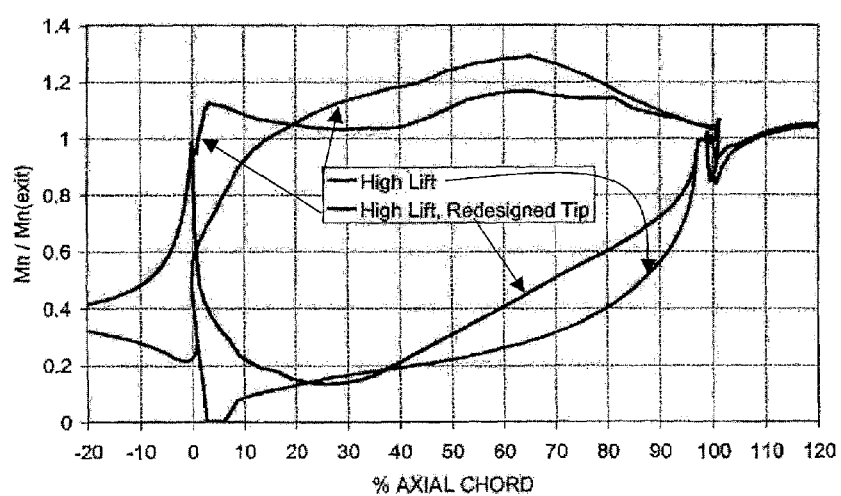
FIG. 14 is a plot of tip Mach number distribution, as calculated by CFD, for the aerofoil in accordance with the invention.

The resulting tip Mach number distribution, as calculated by CFD, is shown in FIG. 14 compared with that of the original high lift design. It will be seen that the Mach numbers along most of the suction surface have been reduced, compared with the unmodified aerofoil. This will result in lower tip leakage flow and reduced mixing. The Mach numbers on the late pressure surface have been raised, that is the local static pressures have been reduced. This will also have the effect of reducing tip leakage. There is a small increase in lift on the suction surface, just after the leading edge, for the redesigned profile. This is because an extreme forward loaded design has been shown as an example here. However, this is not an intrinsic feature of the invention. Comparison of FIG. 11 with FIG. 14 shows that the high lift on the early suction surface in the 2-D design has been removed (radially redistributed) by 3-D effects, as intended.

Figure 15:
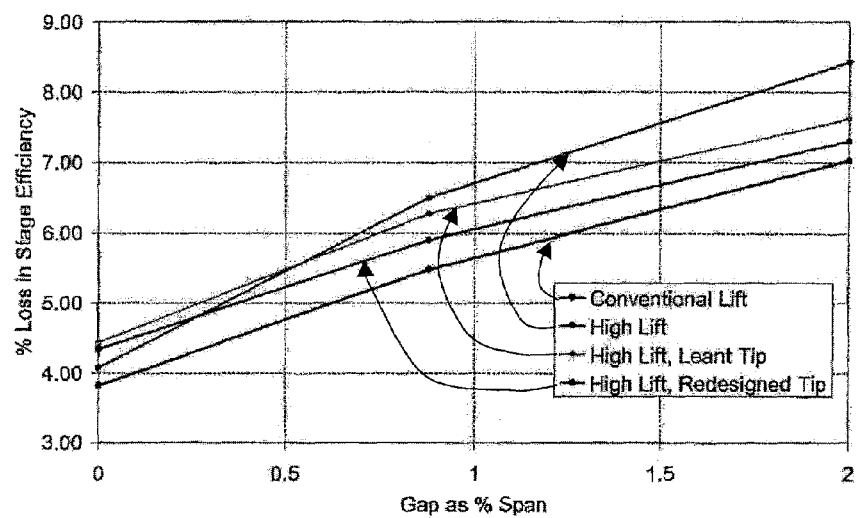
FIG. 15 is a comparison of CFD calculated rotor loss against tip gap.

FIG. 15 plots the variation of CFD predicted rotor loss with tip gap, repeating the results of FIG. 8, but now with the results from the redesigned tip added. It can be seen from the Figure that at zero tip gap, the loss is higher than that of the unmodified high lift aerofoil, and very similar to that of the fully leant tip. The reasons for the loss being higher than the original profile at zero tip gap are much the same as for the fully leant tip. The loss due to over tip leakage is much reduced compare to the unmodified high lift aerofoil. The improvement is better than the fully leant aerofoil analyzed here. Further, for large gaps (two percent of span), the loss is close to that of the low lift aerofoil. The increased loss due to high lift has almost been eliminated.

Figure 16:
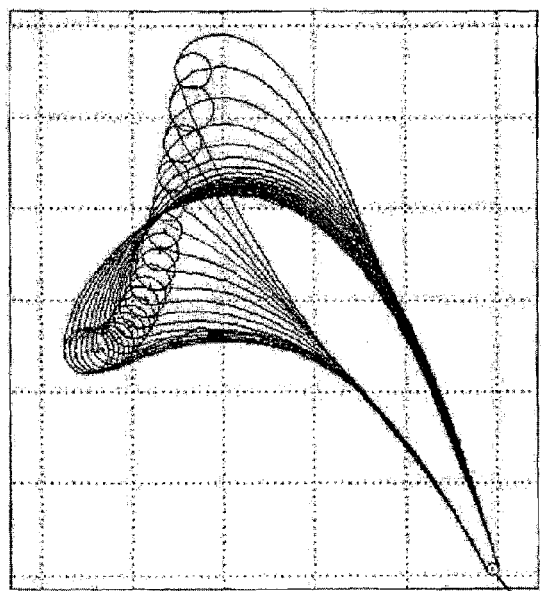
FIG. 16 is a plan view of the rotor blade of FIG. 13 showing successive aerofoil sections equally-spaced radially at 5% of span.

FIG. 16 shows an overlay of some of the 2-D aerofoil sections, viewed radially from above. It can be seen that, in the trailing edge region, the aerofoil shapes are almost coincident. This means that machining of trailing edge cooling holes 6, e.g., arranged as a row of chord-wise running cooling holes in the trailing edge lying in a radial geometric plane, can easily be done in a single operation, minimizing cost of manufacture, and there should be no additional bending stresses in this critical trailing edge region.

REFERENCE SIGNS 1 suction surface
2 pressure surface
3 blade root
4 tip
5 trailing edge
6 trailing edge cooling holes
α radial and/or tangential angle of trailing edge to radial direction While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A rotor blade for a gas turbine engine, the blade comprising:
    a blade root and an aerofoil projecting therefrom, the aerofoil having a leading edge and a trailing edge, a generally concave pressure surface, a generally convex suction surface, a tip section including a tip, and the aerofoil having a shape that varies in section along the length of the airfoil such that the aerofoil comprises:
        a chord-wise convex curvature of the rear suction surface that decreases towards the tip of the blade;
        a convex curvature of the early to mid suction surface that increases towards the tip;
        a stagger of the aerofoil section that increases towards the tip; and
        the trailing edge comprises a straight line.

2. A rotor blade for a gas turbine engine, the blade comprising:
    a blade root and an aerofoil projecting therefrom, the aerofoil having a leading edge and a trailing edge, a generally concave pressure surface, a generally convex suction surface, a tip section including a tip, and the aerofoil having a shape that varies in section along the length thereof of the airfoil such that the aerofoil comprises:
    a chord-wise convex curvature of the rear suction surface that decreases towards the tip of the blade;
    a convex curvature of the early to mid suction surface that increases towards the tip;
    a stagger of the aerofoil section that increases towards the tip;
    the trailing edge comprises a straight line; and
    wherein the increase in stagger is such as to give rise to chord-wise convex curvature on the pressure surface.

3. A rotor blade according to claim 1, wherein the straight line of the trailing edge extends radially relative to the axis of rotation of the blade when in use.

4. A rotor blade according to claim 1, wherein the straight line of the trailing edge extends at an angle to the radial direction relative to the axis of rotation of the blade.

5. A rotor blade for a gas turbine engine, the blade comprising:
    a blade root and an aerofoil projecting therefrom, the aerofoil having a leading edge and a trailing edge, a generally concave pressure surface, a generally convex suction surface, a tip section including a tip, and the aerofoil having a shape that varies in section along the length thereof of the airfoil such that the aerofoil comprises:
    a chord-wise convex curvature of the rear suction surface that decreases towards the tip of the blade;
    a convex curvature of the early to mid suction surface that increases towards the tip;
    a stagger of the aerofoil section that increases towards the tip;
    the trailing edge comprises a straight line; and
    wherein the chord-wise convex curvature of the rear suction surface is eliminated in the tip section to give a flat back surface.

6. A rotor blade for a gas turbine engine, the blade comprising:
    a blade root and an aerofoil projecting therefrom, the aerofoil having a leading edge and a trailing edge, a generally concave pressure surface, a generally convex suction surface, a tip section including a tip, and the aerofoil having a shape that varies in section along the length thereof of the airfoil such that the aerofoil comprises;
    a chord-wise convex curvature of the rear suction surface that decreases towards the tip of the blade;
    a convex curvature of the early to mid suction surface that increases towards the tip;
    a stagger of the aerofoil section that increases towards the tip; and
    the trailing edge comprises a straight line; and
    wherein the chord-wise curvature of the rear suction surface is reversed in the tip section to give a concave back surface.

7. A rotor blade according to claim 1, wherein a lower part of the aerofoil has a minimum radial extent of 40% and a maximum radial extent of 80% of the span.

8. A rotor blade according to claim 1, wherein the tip section is geometrically and aerodynamically blended smoothly into a lower portion of the aerofoil.

9. A rotor blade according to claim 1, wherein trailing edge regions of the aerofoil sections are shaped so as to be similar in 2-D plan view, and comprise a row of chord-wise running cooling holes in the trailing edge lying in a radial geometric plane.

10. A turbine rotor for a gas turbine engine, comprising a plurality of rotor blades according to claim 1.

11. A gas turbine engine including a turbine rotor according to claim 10.

12. A rotor blade according to claim 2, wherein the straight line of the trailing edge extends radially relative to the axis of rotation of the blade when in use.

13. A rotor blade according to claim 2, wherein the straight line of the trailing edge extends at an angle to the radial direction relative to the axis of rotation of the blade.

* * * * *